UNITED STATES PATENT OFFICE.

COMMODORE O. P. HOWELL, OF WASHINGTON, DISTRICT OF COLUMBIA.

COMPOSITE FUEL AND PROCESS OF MAKING SAME.

SPECIFICATION forming part of Reissued Letters Patent No. 11,894, dated March 5, 1901.

Original No. 624,495, dated May 9, 1899. Application for reissue filed January 12, 1901. Serial No. 43,019.

*To all whom it may concern:*

Be it known that I, COMMODORE O. P. HOWELL, a citizen of the United States, residing at Washington, District of Columbia, have invented certain new and useful Improvements in Composite Fuel and Processes of Making the Same; and I do hereby declare the following to be a full, clear, and exact description of the invention, that will enable others skilled in the art to which it appertains to make and use the same.

My invention relates to a composite or "artificial" fuel in which pulverized coal forms the base or principal ingredient. In this class of fuel the pulverized coal is mixed with materials or ingredients usually of a much more inflammable character, which while aiding combustion of the coal also act as a binding medium for retaining the mass in the form of blocks or briquets into which it is compressed for use.

In all prior compositions of this character to which my knowledge extends the materials or ingredients forming the "binder" have been of such a character as to cause or allow the mass to disintegrate from the heat of the fire long before the larger portion of the coal has been heated to a degree sufficient to cause combustion or to coke the mass, which would result in retaining it in its original shape until entirely consumed.

The object sought by me is a composite fuel, of which pulverized coal is the base or principal ingredient, which will be highly inflammable, and yet retain the form into which it is compressed a sufficient length of time while burning to insure complete combustion of all its parts, and which may be manufactured at small cost and be highly satisfactory in use.

The ingredients of which my fuel is composed are pulverized coal, fat-pine excelsior or excelsior and rosin, and fiber of the Mexican cactus, treated and mixed in a manner to be hereinafter described.

Fat-pine excelsior is selected by me because of its large percentage of rosin. Excelsior of white pine or other wood may be employed with fairly good results if first saturated with rosin; but the best results will accrue from the use of fat-pine excelsior as treated by me.

Rosin has been employed as a binding medium in a large number of prior compositions; but in almost every instance the rosin alone is relied upon to bind the mass together. By the use of fat-pine excelsior or excelsior and rosin, thoroughly massed throughout the block or briquet into which the composition is compressed, a binding effect is attained which is not possible with rosin alone or with rosin and sawdust or wood in other form, and the mass is rendered much more inflammable.

Excelsior and rosin combined with pulverized coal and compressed into suitable blocks forms in itself a highly-satisfactory fuel; but I have found that by the addition thereto of fiber of the Mexican cactus the mass is retained in shape for a much longer time while burning and the coal consequently more thoroughly consumed. This I attribute to the slow-burning character of the cactus fiber, due to its low percentage of carbon. Cactus fiber is a woody fiber containing a large amount of silicate. While combustible, it is very slow-burning. When incorporated in a briquet, somewhat as hair is incorporated in mortar, the slow-burning fiber seems to bind and hold the mass together until the thorough ignition of the mass has taken place. Then, even if the slow-burning fiber be consumed, the briquet will substantially retain its form under ordinary conditions of combustion until the coal or coke which may be produced from the partial combustion of the coal is practically all consumed. It is advisable that the slow-burning fiber be not closely commingled with the more rapidly combustible excelsior before incorporation in the briquet, for the reason that the slow-burning fiber should be given as great an opportunity as possible to act as a binding agent, while the quick-burning excelsior carries fire rapidly through the mass. For the quick-burning or igniting ingredient I use fat-pine excelsior, which contains rosin in sufficient amount, or I treat excelsior with rosin separately from the other ingredients of the compound, as will be hereinafter described. The Mexican-cactus fiber is used in lengths varying from one and one-half to three inches and is incorporated with the coal in about equal quantity with the excelsior and performs the same function in holding the mass together; but I have found that by its use the mass remains in shape for a longer time while burning than where the excelsior alone is used and that complete combustion of the particles of coal is practically attained.

In the manufacture of the composition I prefer to first treat the fat-pine excelsior to a process of evaporation to free it of a low grade of rosin, and thus free the compound as far as possible from smoke and objectionable odor. This evaporation of the excelsior may be accomplished by exposing it to dry air for a sufficient length of time or by any well-known apparatus usually employed for such purposes. A high grade of melted rosin is then poured or sprinkled over the mass of excelsior, using about one ounce of rosin to one pound of excelsior. Where white-pine excelsior is used, no evaporating process will be required; but rosin is incorporated therewith in the manner above described before it is mixed with the other ingredients of the compound, and a larger percentage of rosin should be used to saturate the excelsior, which should also be heated to facilitate the absorption of rosin. To ninety-four pounds of pulverized coal I add three pounds of the prepared excelsior and three pounds of the Mexican-cactus fiber. These are put into a highly-heated receptacle and stirred until the mass is thoroughly mixed, after which it is pressed while hot in suitable molds and allowed to cool.

In practice I employ a heating and mixing receptacle in the form of a horizontal cylinder. This cylinder is heated by live steam conveyed through pipes surrounding the cylinder beneath a metallic jacket covered with asbestos. Within the cylinder is arranged a worm-screw, which is revolved to mix the heated compound and also to force it through an opening in one end of the cylinder, where it is received by molding apparatus and compressed into shape.

The object in first incorporating the rosin with the excelsior is to prevent as far as possible the absorption of rosin by the cactus fiber during the heating and mixing process. The rosin contained in the fat-pine excelsior or that added in its treatment I have found sufficient to thoroughly unite the mass when compressed hot under moderate pressure, and while I do not limit myself to exact proportions of any of the ingredients employed those stated have been found by me to give the most satisfactory results.

Having thus described my invention, what I claim as new, and desire to secure by Letters Patent, is—

1. A composite fuel composed of pulverized coal, excelsior, rosin, and fiber of the Mexican cactus.

2. A composite fuel composed of pulverized coal, fat-pine excelsior, and fiber of the Mexican cactus compressed into blocks or briquets, substantially as described.

3. A composite fuel, composed of mixed coal, excelsior, rosin, and a slowly-burning fiber, which remains for a considerable time during combustion as a binding agent.

4. A composite fuel composed of coal, a quick-burning fiber, of resinous nature, and a slowly-burning, non-resinous fiber, substantially as described.

5. The process of making composite fuel, which consists in incorporating rosin with excelsior, then mixing the excelsior thus prepared with pulverized coal and fiber of the Mexican cactus, subjecting the mixture to heat, and while the same is still hot, molding it into suitable blocks.

6. The process of making composite fuel which consists in evaporating fat-pine excelsior to free it of a low grade of rosin, then incorporating therewith rosin of a higher grade, then mixing the excelsior thus prepared with pulverized coal and fiber of the Mexican cactus, subjecting the mixture to heat, and while the same is still hot, molding it into suitable blocks.

In testimony whereof I affix my signature in presence of two witnesses.

COM. O. P. HOWELL.

Witnesses:
HARVEY T. WINFIELD,
W. A. BARTLETT.